United States Patent
Herzog et al.

(10) Patent No.: US 7,987,471 B2
(45) Date of Patent: Jul. 26, 2011

(54) MOBILE DEVICE MANAGEMENT PROXY SYSTEM

(75) Inventors: Shai Herzog, Bellevue, WA (US); Marie Hagman, Seattle, WA (US); Bogdan M. Tepordei, Seattle, WA (US); Michael E. Deem, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/698,639

(22) Filed: Jan. 26, 2007

(65) Prior Publication Data

US 2008/0183800 A1 Jul. 31, 2008

(51) Int. Cl.
G06F 9/44 (2006.01)
G06F 15/16 (2006.01)
G06F 9/46 (2006.01)

(52) U.S. Cl. ............ 719/317; 709/202; 718/100

(58) Field of Classification Search ........ 719/310, 719/317; 718/1, 100; 709/202
See application file for complete search history.

(56) References Cited

U.S. PATENT DOCUMENTS

| | | | |
|---|---|---|---|
| 6,311,206 B1 | 10/2001 | Malkin et al. | |
| 6,516,316 B1 | 2/2003 | Ramasubramani et al. | |
| 6,697,839 B2 | 2/2004 | Sini et al. | |
| 6,978,453 B2 | 12/2005 | Rao et al. | |
| 7,155,519 B2 * | 12/2006 | Lo et al. | 709/227 |
| 7,315,885 B2 * | 1/2008 | Weisshaar et al. | 709/217 |
| 2001/0055285 A1 | 12/2001 | Tomoike | |
| 2002/0103881 A1 * | 8/2002 | Granade et al. | 709/218 |
| 2002/0184360 A1 | 12/2002 | Weber et al. | |
| 2003/0017826 A1 * | 1/2003 | Fishman et al. | 455/426 |
| 2004/0083262 A1 * | 4/2004 | Trantow | 709/203 |
| 2004/0215711 A1 | 10/2004 | Martin et al. | |
| 2005/0055397 A1 | 3/2005 | Zhu et al. | |
| 2005/0073982 A1 * | 4/2005 | Corneille et al. | 370/338 |
| 2005/0213592 A1 * | 9/2005 | Kalish | 370/401 |
| 2005/0228847 A1 | 10/2005 | Hayes, Jr. | |
| 2005/0232191 A1 | 10/2005 | Wills | |
| 2006/0010437 A1 | 1/2006 | Marolia | |
| 2006/0026228 A1 | 2/2006 | Kim | |
| 2006/0026305 A1 | 2/2006 | Illowsky et al. | |
| 2006/0200503 A1 * | 9/2006 | Dosa et al. | 707/203 |
| 2006/0200814 A1 | 9/2006 | Kontinen et al. | |
| 2006/0217111 A1 | 9/2006 | Marolia et al. | |
| 2006/0217113 A1 | 9/2006 | Rao et al. | |
| 2006/0230395 A1 | 10/2006 | Paul et al. | |
| 2006/0271662 A1 * | 11/2006 | Fritsch et al. | 709/223 |

(Continued)

OTHER PUBLICATIONS

Adwankar, et al., "Universal Manager: Seamless Management of Enterprise Mobile and Non-Mobile Devices", Date: 2004http://ieeexplore.ieee.org/xpl/freeabs_all.jsp?arnumber=1263082.

(Continued)

*Primary Examiner* — Van H Nguyen

(57) ABSTRACT

A general-purpose proxy mobile device management architecture. The architecture serves as a proxy for a mobile client seeking services from backend systems. A virtual client image of state information associated with the mobile client is stored such that when the mobile client interacts with the proxy, the virtual image updates to the latest client state. Based on the changes to the state, the proxy system asynchronously accesses one or more arbitrary services of the backend systems on behalf of the mobile client. When the mobile client connects to the proxy, the proxy will have the latest services associated with the states of the virtual image, and updates the state of the mobile client. Updating and accessing occurs asynchronously on the frontend between the proxy and mobile devices and on the backend between the proxy and the backend systems.

20 Claims, 13 Drawing Sheets

U.S. PATENT DOCUMENTS

2006/0282516 A1* 12/2006 Taylor et al. .................. 709/220
2007/0011292 A1* 1/2007 Fritsch et al. ................. 709/223

OTHER PUBLICATIONS

Mei, et al., "A Remote Personal Device Management Framework Based on SyncML DM Specifications", Date: 2005, http://portal.acm.org/citation.cfm?id=1071275&coll=ACM&dl=ACM&CFID=75919783&CFTOKEN=92791909.

Raatikainen Kimmo, "A New Look at Mobile Computing", Date: Aug. 16, 2004, http://www.cs.karelia.ru/studies/wireless/readings/newlook.pdf.

International Search Report, mailed May 16, 2008, 11 pages.

Falk et al., "Decentralized Reconfiguration Control", In Proc. SDR'04, Phoenix, AZ, USA, Nov. 2004.

Wagner et al., A Roadmap to Advanced Personalization of Mobile Services, In Proc. International Conference DOA/ODBASE/CoopIS 2002, Irvine CA, USA, Oct. 2002.

* cited by examiner

MOBILE DEVICE MANAGEMENT PROXY SYSTEM

BACKGROUND

The convergence of cellular and IP-based technologies serves as the catalyst for merging technologies into portable devices. For example, mobile clients such as cell phones can now access IP-based services on IP networks such as the Internet. Similarly, computing systems such as portable computers can include mobile client technology that facilitates making voice calls over the Internet to telephone destinations. This is due in large part to the network service providers including means to bridge the major networks so that users in both regimes can access each others services.

It is becoming commonplace that users will have multiple computing devices each having a different set of requirements for interacting with data and programs. In a corporate environment, maintaining the latest settings and information becomes important as employees are more mobile, thereby taking devices offline regularly during travel, for example. Consequently, when the employee needs to reconnect to the corporate environment, perhaps with a new device, it is desirable that the particular device characteristics such as operating system, communications capabilities, etc., are not limitations that prevent the needed access by the employee.

Corporations are further along in solving this problem with the many different computing systems in use today. Users can bring many different types of computers into the enterprise, and given the proper authorizations, can easily access the services provided by backend systems. However, support for mobile clients should also be available to provide transparent connectivity for daily operations. For example, device and user presence-enabled communications in smartphones can be useful to the enterprise to simplify workflow and improve productivity. However, there needs to be mechanisms in place that can readily identify such mobile client capabilities for the enterprise and transparently detect and maintain client information whether the client is online or offline.

Accordingly, businesses are migrating to the integration of systems to provide enterprise support in terms of an open-standards-based infrastructure for the many different types of devices. However, conventional solutions lack extensible, homogenous, and scalable architectures for supporting disparate mobile client technologies and the many different services that can be offered by enterprise backend systems.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture is a flexible, extensible and robust mobile client (or client device) management system. The system serves as a proxy for a mobile client seeking services from backend systems. The proxy system includes a virtual client image of state information associated with the mobile client. When the mobile client interacts with the proxy, the proxy server validates the virtual image of the client and then interacts with the virtual image to optimize the process of getting the latest updates to the client from the backend systems. Additionally, based on the changes to the state, the proxy system automatically and asynchronously accesses one or more arbitrary services of the backend systems on behalf of the mobile client. When the mobile client connects to the proxy, the proxy will have the latest services associated with the states of the virtual image.

The proxy architecture can access and process the arbitrary services using an abstraction component (e.g., services drivers) that abstracts the disparate services into a format that can be processed by the proxy to update the client state of the virtual image. Thus, the architecture is extensible and scalable. Moreover, as employed in a corporate enterprise, for example, the architecture facilitates load balancing where a large number of mobile clients connect to access services. Multiple proxy management systems can be employed to dynamically scale up to meet the demand for client services and scale down when the demand diminishes. In other words, clients are not required to connect to a specific proxy device management system.

More specifically, the proxy is a device management system that includes a task execution engine that receives and processes tasks submitted as units of work from arbitrary backend systems. State information of the mobile client can be stored as the virtual client image, which image can be stored in association with multiple proxy systems, for example. Thus, multiple proxy management systems can access the images as needed. The system facilitates the ability to evaluate backend system work and any work needed for network access protection, for example, based on the virtual device image (and when device is offline). The task engine operates asynchronously with the backend systems to access the desired services based on changes in the state of the virtual client image.

The system can also maintain a cache of device configuration service provider values that can be frequently utilized and are non-volatile. In accordance with validation, the cached information can also be validated separately or in combination with validation of the image. The task execution engine is able to interface with arbitrary backend systems since it abstracts the units of work to be performed opposite the device using a "task" object. Accordingly, any number of drivers that connect the proxy to respective backend systems can queue units of work to be performed opposite the device. Moreover, the engine can process the units of work in batches.

The proxy system can utilize the virtual device identity to perform evaluation testing on one or more tasks before the associated mobile device connects. This mechanism facilitates determining when a client device needs critical updates, for example, and should be forced to contact to the management endpoint. The proxy task engine interacts with the multiple arbitrary backend systems asynchronously, thereby enabling drivers to submit work at any time, whether the client is online or offline. Additionally, the task engine does not need to wait for all drivers to respond before it can begin processing.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Generally, the disclosed architecture is a mobile client device proxy management server for a mobile client seeking services from enterprise backend systems. Client state information associated with the mobile client is stored at the server, for example, such that when the mobile client interacts with the proxy, the client state of the device is updated to the latest client state. Based on the changes to the state, the proxy system asynchronously accesses one or more arbitrary services of the backend systems on behalf of the mobile client. When the mobile client connects to the proxy, the proxy will have the latest services associated with the state of the virtual image. Similarly, the proxy system facilitates asynchronous connection to the client in that the client can connect at any time and receive the latest state information from the proxy and/or pass additional state information to the proxy.

Figure 1:
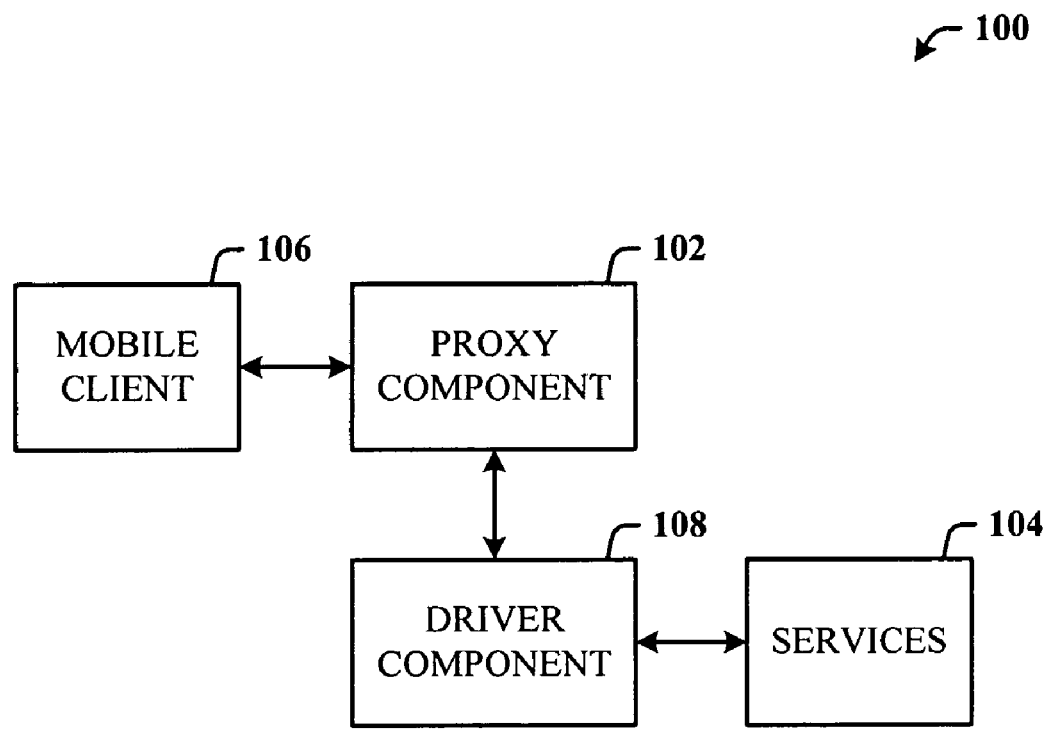
FIG. 1 illustrates a computer-implemented proxy device management system for providing mobile client proxy services in accordance with the disclosed innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof Referring initially to the drawings, FIG. 1 illustrates a computer-implemented proxy device management system 100 for providing mobile client proxy services in accordance with the disclosed innovation. The system 100 includes a proxy component 102 for asynchronously accessing arbitrary services 104 of an enterprise backend system, for example, on behalf of a mobile client 106. The system 100 also comprises a driver component 108 that includes drivers for accessing the arbitrary services and abstracting the services into tasks for processing associated with state of the mobile client. In one embodiment, the proxy component 102 and the driver component 108 comprise the proxy device management system 100.

In an alternative implementation, the driver component 108 can be a separate and remote component from the device management system 100. For example, drivers of the driver component 108 can each be part of the respective backend service (or system that provided the service) such that when the proxy component 102 requests connection to the respective service, the backend driver at the corresponding service location facilitates access thereto.

In yet another implementation, when a new backend system is brought online, also providing and/or requiring a new driver, the driver component 108 can facilitate automatic upload and installation of the driver for future automated and asynchronous processing by the proxy component 102.

Figure 2:
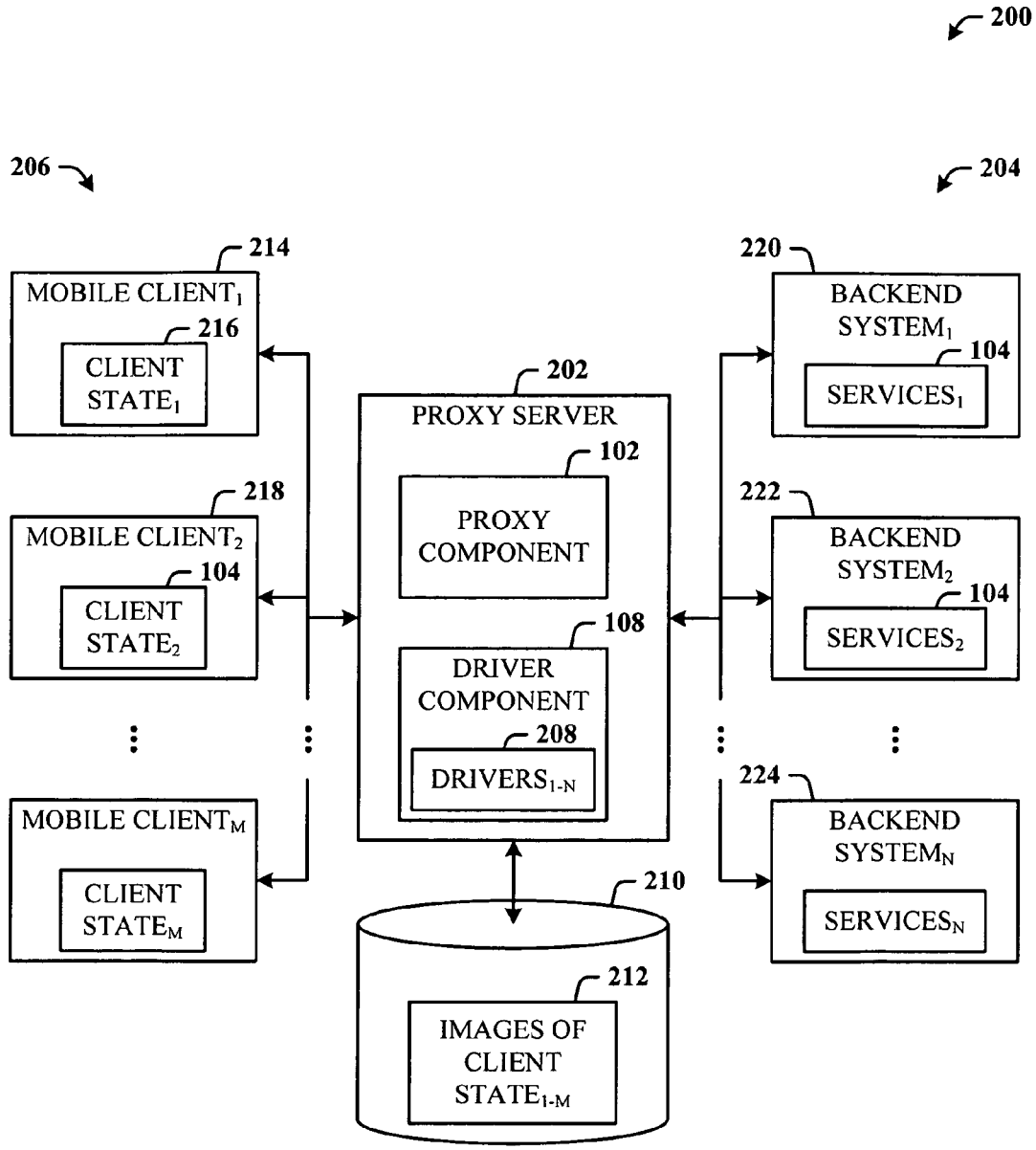
FIG. 2 illustrates a more detailed system for proxy device management in accordance with the innovation.

FIG. 2 illustrates a more detailed system 200 for proxy device management in accordance with the innovation. The system 200 includes a device proxy server 202 for accessing one or more backend systems 204 (denoted BACKEND SYSTEM$_1$, BACKEND SYSTEM$_2$, ..., BACKEND SYSTEM$_N$, where N is a positive integer) providing corresponding services (denoted SERVICES$_1$, SERVICES$_2$, ..., SERVICES$_N$) on behalf of one or more mobile clients 206 (denoted MOBILE CLIENT$_1$, MOBILE CLIENT$_2$, ..., MOBILE CLIENT$_M$, where M is a positive integer). Each of the clients 206 includes corresponding client state (denoted CLIENT STATE$_1$, CLIENT STATE$_2$, ..., CLIENT STATE$_M$). The client state includes client information such as operating system type, version, hardware configuration, application versions, user information, data versions, and so on. The proxy server 202 includes the proxy component 102 (e.g., a task execution engine) that drives the proxy server 202 for accessing the backend systems 204. The proxy server 202 also includes the driver component 108 that includes drivers 208 (denoted DRIVERS$_{1-N}$) for each of the backend systems 204 that facilitate access to the respective backend servers 204 (BACKEND SYSTEMS$_{1-N}$). The server 202 can also include an associated datastore 210 for storing virtual images 212 of the client state (denoted IMAGES OF CLIENT STATE$_{1-M}$) for each of the clients 206. The datastore 210 can serve as a cache of device configuration service provider (CSP) values that are frequently needed and non-volatile.

In a first operation, when a first mobile client 214 connects to the proxy 202, first client state 216 is transferred and stored to the proxy datastore 210. The proxy component 102 determines which of the backend systems 204 should be accessed to provide the services needed or requested by the first client 214. Once determined, the driver component 108 provides the associated drivers 208 for accessing the corresponding backend systems 204 and the corresponding services. The selected services provide the desired services information back to the driver component 108, which abstracts the services information into arbitrary tasks for execution by the proxy server 202, which updates the stored first client state of the stored images 212 and the first client state 216 (if the first client 214 is connected).

In a second operation, the first client 214 then goes offline (e.g., the client user powers off the first client 214, goes out of range, ...) after the completion of the above first operation. Thereafter, in one implementation, the proxy server 202 connects asynchronously to the backend systems 204 using the same drivers as previously employed for the first client 214 (based on the driver information stored in the first client image of the stored images 212), detects that updates to the existing first client image of the stored images 212 exist, and uploads the data to the first client image stored in association with the proxy server 202. Eventually, when the first client 214 reconnects to the proxy server 202 to obtain enterprise backend services, rather than connecting through to the backend systems 204, the desired information is readily available from the first client image in the stored images 212 of the proxy server 202.

It is to be appreciated, however, that the first client 214 could still be connected through the proxy server 202 to one or more of the backend systems 204. The stored virtual image 212 for the first client state 216 may not be the absolute latest in time. This is because of the multiplicity of virtual client images 212 that can be undergoing update processing by the proxy server 202. In other words, while a virtual image of client state of the datastore 210 for a second client 218 is undergoing processing, the backend systems 204 can receive updates that have yet to be moved to the virtual image of the first client state. Thus, the virtual image of the first client on the datastore 210 will be aged. If the first client 214 requires (e.g., based on a user setting) that the first client state 216 be the absolute latest, the first client 214 can be routed through to the backend systems 204 to obtain the latest information or force the proxy server 202 to conduct an update operation for all or a portion of the first client state 216. In either case, the virtual image of the first client state 212 will be updated.

In a more specific description of actual operation, the proxy server 202 operates asynchronously on the frontend (for mobile devices) as well as asynchronously on the backend (for backend systems). In other words, while one or more of the clients 206 are connecting to receive updates from corresponding virtual client images 212, the proxy server 202 can be conducting access and update operations on the backend. In support thereof, the proxy server 202 can include a cache subsystem for providing fast read/write access to stored virtual image state 212. Accordingly, it is to be understood that multiple proxy server systems 202 can be employed to handle load associated with such operations. Load balancing, scaling and caching will be described infra.

The proxy component 102 of the proxy server 202 is able to work with many arbitrary backend systems 204 because the proxy server 202 is capable of abstracting the work to be performed opposite the mobile client as units of work (or as tasks) using a "task" object. Accordingly, any number of drivers 208 that connect the proxy component 102 to respective backend systems 204 can queue work to be done for the corresponding mobile client (and client device). Accordingly, the proxy component 102 (or proxy engine) can process the tasks in batches. Thus, the proxy server 202 facilitates a task-oriented abstraction enabling many backend systems 204 to submit units of work to the central proxy component 102.

The proxy server 202 can use the virtual client images 212 (including device identity information) to do evaluation testing of tasks before the respective client connects. Thus, this mechanism can be used for determining if a client needs critical updates and should be forced to contact to the management endpoint (or backend systems 204) immediately.

As previously described, the proxy component 102 works with multiple backend systems 204 asynchronously. This enables the drivers 208 to submit work at any time, whether the client is connected or not. Additionally, the proxy component 102 does not need to wait for all drivers to respond before it can begin processing the services from the backend systems 204. In other words, the drivers associated with a first backend system 220 and a second backend system 222 can be utilized for data processing before a driver for a third backend system 224 responds.

Figure 3:
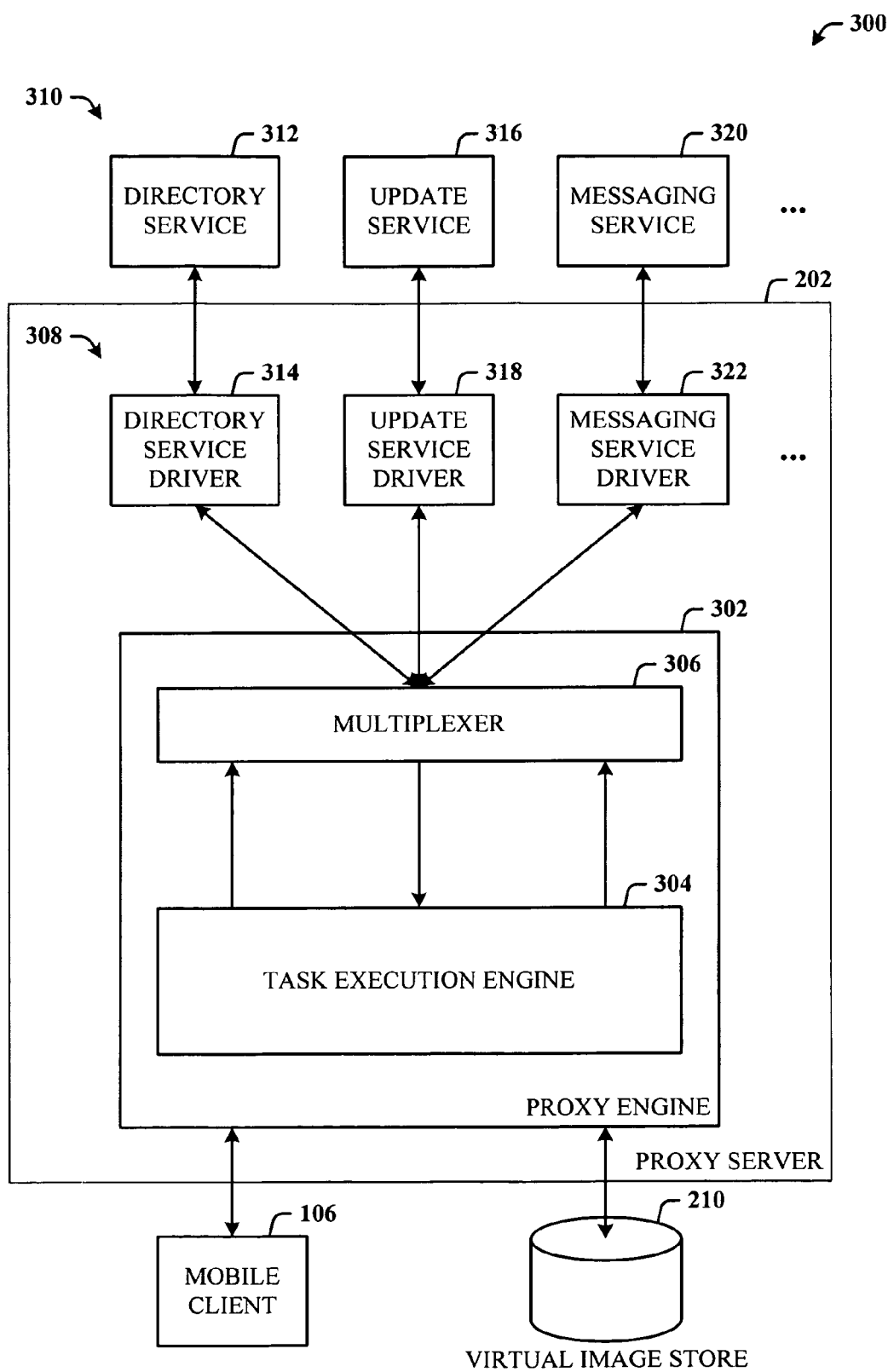
FIG. 3 illustrates an alternative proxy device management system that facilitates mobile client proxy services.

FIG. 3 illustrates an alternative proxy device management system 300 that facilitates mobile client proxy service. The proxy server 202 of the system 300 includes a proxy engine 302 that comprises a task execution engine (TEE) 304 for executing tasks associated with updating state of the client 106. The proxy engine 302 can also include a multiple access component 306 (e.g., a multiplexer or "mux") such that communications can occur via multiple drivers 308 to corresponding multiple services 310. However, it is to be understood that inclusion of the mux 306 is optional. Here, at least three services are provided: a directory service 312 (e.g., Active Directory™ by Microsoft Corporation) and associated directory service driver 314, an update service 316 (e.g., Window Server Update Services™ by Microsoft Corporation) and associated update service driver 318, and a messaging service 320 (e.g., SMS-short message service, MMS-multimedia messaging service, instant messaging, . . . ) and associated messaging service driver 322. Although only three services and drivers are illustrated more services and associated drivers can be implemented. Additionally, as indicated above, multiple proxy engines 302 can be employed dynamically to handle changing demands for mobile devices on the frontend and changing demands on the backend services which cannot be efficiently handled by a single proxy engine 302.

The multiplexer 306 facilitates communicating with the services 310. The TEE 304 can obtain client state from the client 106, process the state to determine which portions should be updated, and request access to the appropriate services 310 based on the desired updates. The TEE 304 sends the requests to the mux 306 for routing via the drivers 308 to the services 310. Updates are then passed back to the drivers 308 for abstraction processing into tasks, and then to the mux 306 for processing by the TEE 304 for insertion into the client virtual image datastore 210 and/or the client 102. As before, task execution can occur independently of whether the client 102 is online or offline. If offline, task execution occurs against the client state image of the datastore 210. Thus, when the client 102 connects to the proxy engine 302, update to the client state occurs from the virtual client state image of the datastore 210 rather than the services 310. Similarly, task execution can occur independently of whether the proxy 202 is connected to the backend services 310. As long as there are tasks queued in the proxy engine 302 for execution, image update processing can occur.

The disclosed mobile device proxy management system is a general-purpose system in that backend services can be hosted or provided, accessed and processed by the proxy server 202 regardless of the type of backend system providing the service. For example, backend systems can provide services using many different types of operating systems (e.g., Unix, Linux, Windows, Apple, etc.), and file structures, protocols, and data formats, for example. The drivers 308 perform the translation processing to abstract the services information into arbitrary tasks that are executable by the TEE 304. In contrast, conventional architectures provide hard-coded implementations that are inextensible and one-to-one from mobile device to backend system. The disclosed architecture provides a many-to-many extensible implementation with asynchronous operation both on the frontend and backend.

Figure 4:
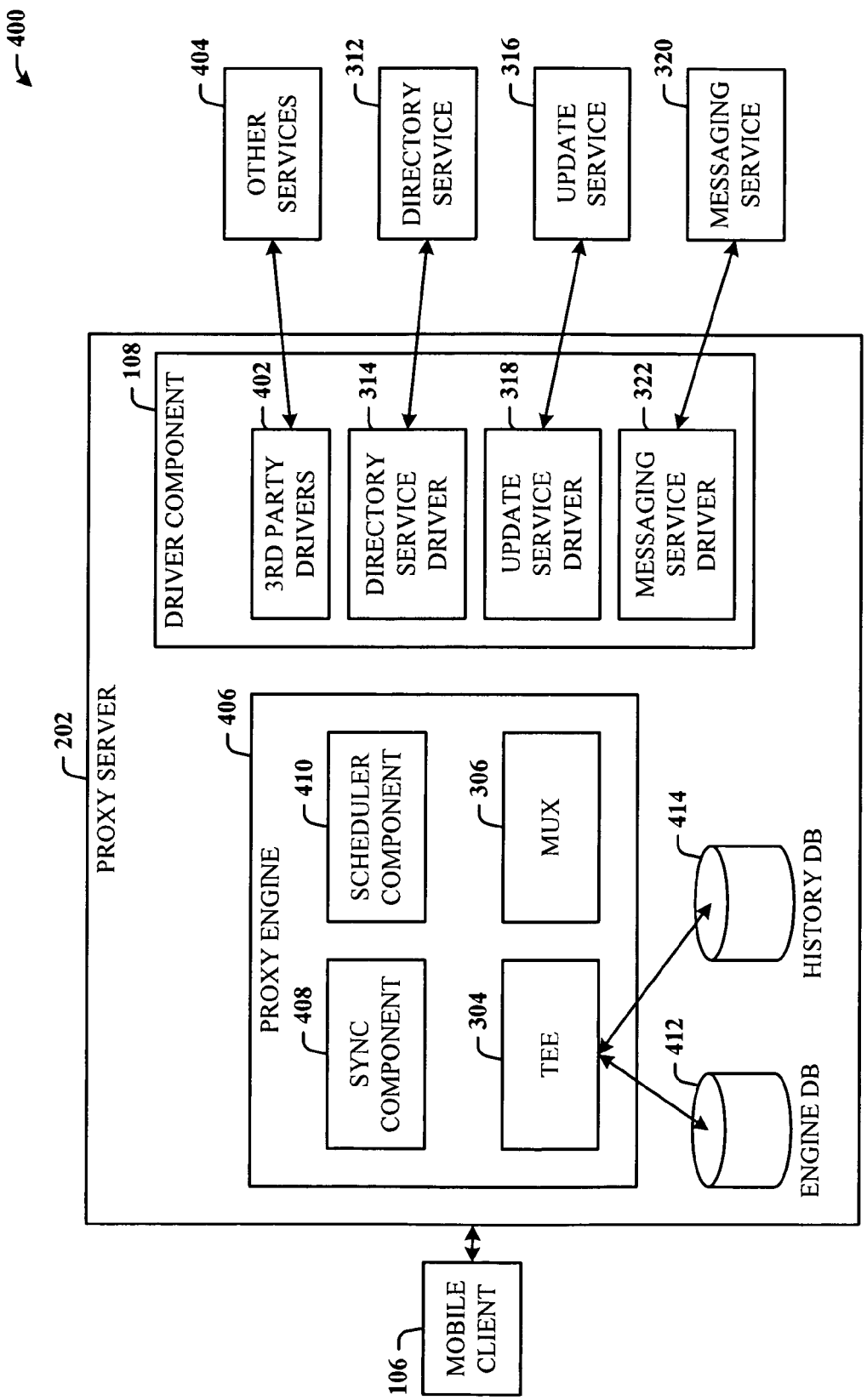
FIG. 4 illustrates an alternative proxy device management system that employs scheduling and synchronization processing.

FIG. 4 illustrates an alternative general-purpose proxy device management system 400 that employs scheduling and synchronization processing. Here, the driver component 108 includes the directory service driver 314, the update services driver 318, messaging service driver 322, for the respective directory service 312, update service 316 and messaging service 320. Additionally, the system 400 is extensible such that 3$^{rd}$ party drivers 402 can be provided as part of the driver component 108 for other backend services 404.

A proxy engine 406 includes the TEE 304 and mux 306, the functionality of which is described supra. Additionally, the proxy engine 406 includes a synchronization component 408 for synchronizing state on the frontend between the client 106 and the virtual state image of the server 202, and on the backend of the proxy 202 between the backend systems and the virtual state image of the server 202. A scheduler component 410 facilitates scheduling when the server 202 performs synchronization on the backend and/or the frontend. For example, according to one implementation, synchronization can be based on temporal information (e.g., time, date, days since last update, etc.). In another implementation, scheduling is according to versions of state data. It is to be appreciated that scheduling can be facilitated according to rules for each client, sets of clients, categories of clients, device information, according to client state, changes in backend system policies, backend data, and so on.

Here, the TEE 304 interfaces to two datastores: an engine datastore 412 and a history datastore 414. The engine datastore 412 can persist information related to scheduling for clients, rules, tasks for execution, and synchronization, for example. The history datastore 414 can facilitate the storage of client virtual state image data for multiple clients that connect to this proxy server 202. It is to be understood that the datastores (412 and 414) can be cache memory (e.g., DRAM) for fast execution and processing. Thus, the proxy server 202 can access a remote datastore (not shown) that stores data for multiple proxy servers, which selected portions of which are then uploaded to the appropriate proxy server for caching and asynchronous processing.

Caching functionality can be provide such as pre-fetching and/or pre-caching information as a function of user preference, state, context or other metrics enhances a user experience and offsets some of the inherent limitations (e.g., bandwidth, memory, processing capability, display real estate . . . ) of portable devices as compared to desktop computers. It is to be appreciated that virtual image data deemed of low value based on device capabilities and user-related metrics, for example, can be selectively aged out of storage to make room for new content.

In one exemplary embodiment, the proxy server supports OMA DM (Open Mobile Alliance for Device Management), and communications between the server 202 and the client can be according to the SyncML protocol. OMA DM specifies the management of mobile clients and devices such as mobile phones and mobile capable portable computing devices. SyncML is an XML (extensible markup language)-based protocol proposed for open systems. SyncML is the common language for synchronizing devices and applications over any network. By leveraging XML, SyncML can be utilized for synchronization of networked information with any mobile device, and mobile information can be synchronized with any networked applications. Personal information such as email, calendars, to-do lists, contact information, device information, application information, and other desired data can be made consistent, accessible and up-to-date. Additionally, SyncML enables synchronization over fixed networks, infrared, cable, or Bluetooth, for example.

Figure 5:
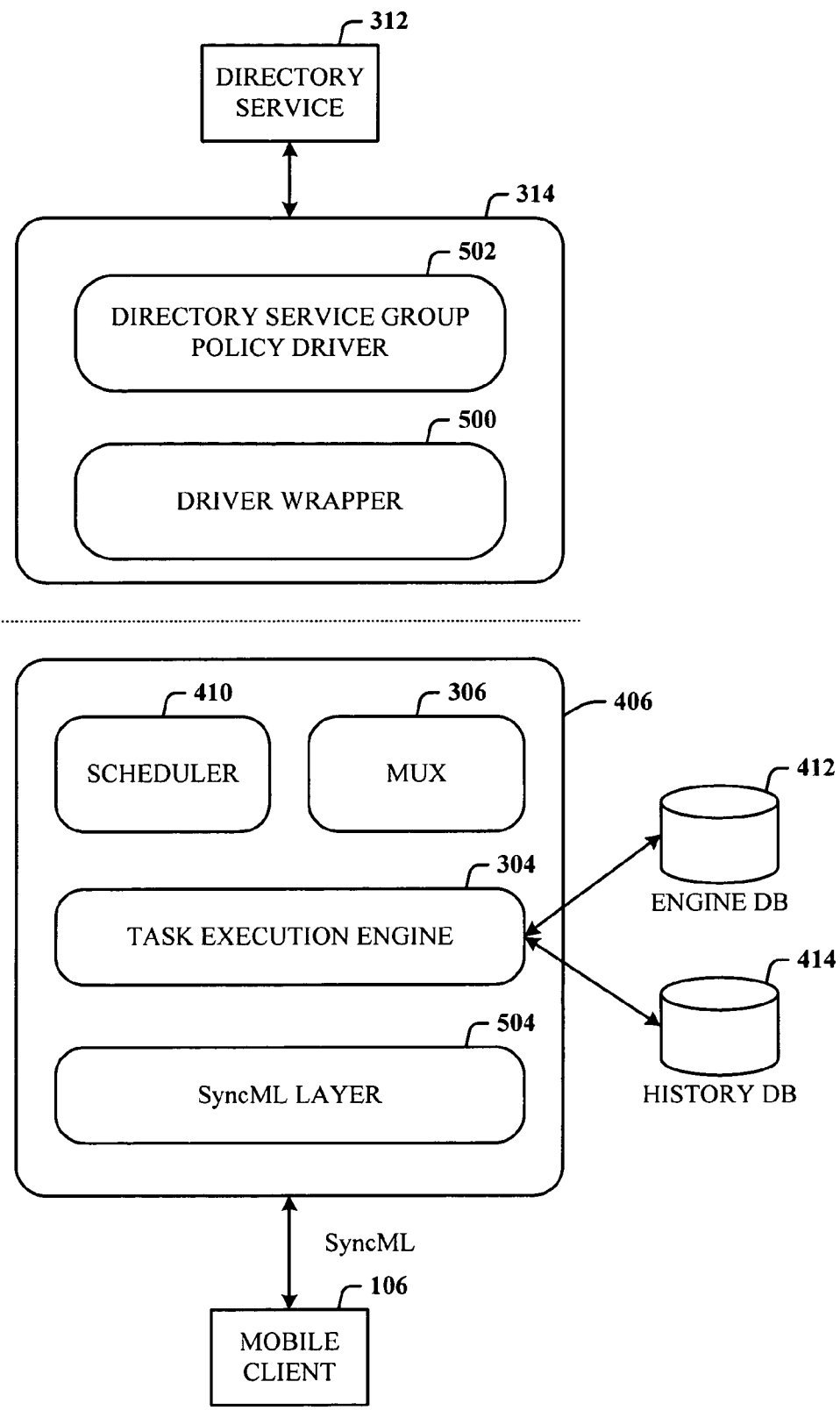
FIG. 5 illustrates flow associated with exemplary directory services access and synchronization in accordance with the innovation.

FIG. 5 illustrates flow associated with an exemplary directory services access and synchronization in accordance with the innovation. The scheduler 410 can initiate a synchronization session to the backend system directory service 312 such that the proxy engine 406 communicates information to the directory service driver 314. The driver 314 bundles the information via a driver wrapper module 500 and communicates the bundled information to the directory service 312 via a directory service group policy driver 502. The directory service 312 returns the desired updated service information or work back to the driver 314, which abstracts the work as one or more tasks. The tasks are passed through the driver wrapper 500 for unwrapping and then through the proxy engine 406 to the engine database 412 for execution. As described supra, the one or more of the tasks can also be queued for processing at a later time. Thus, task prioritization management can be employed in the proxy engine 406.

The client 106 can initiate connection to a proxy engine layer 504 (e.g., SyncML) of the proxy engine 406 to pass XML-based data via a protocol (e.g., SyncML). The layer 504 forwards the XML data to the TEE 304 for processing. The TEE 304 pulls the task information from the engine database 412 and executes the tasks to update the client 106 through the layer 504, and to update the virtual image (not shown) stored on the activity history database 414. At the layer 504, the executed task data is converted back into XML and communicated to the client 106 via the protocol. The client 106 and virtual state image are now both updated with the latest client state. It can be appreciated that in one implantation, the mobile device can be updated first, while the proxy holds the updated state in cache. Thereafter, the cached information is persisted to the virtual state image of the proxy server.

Figure 6:
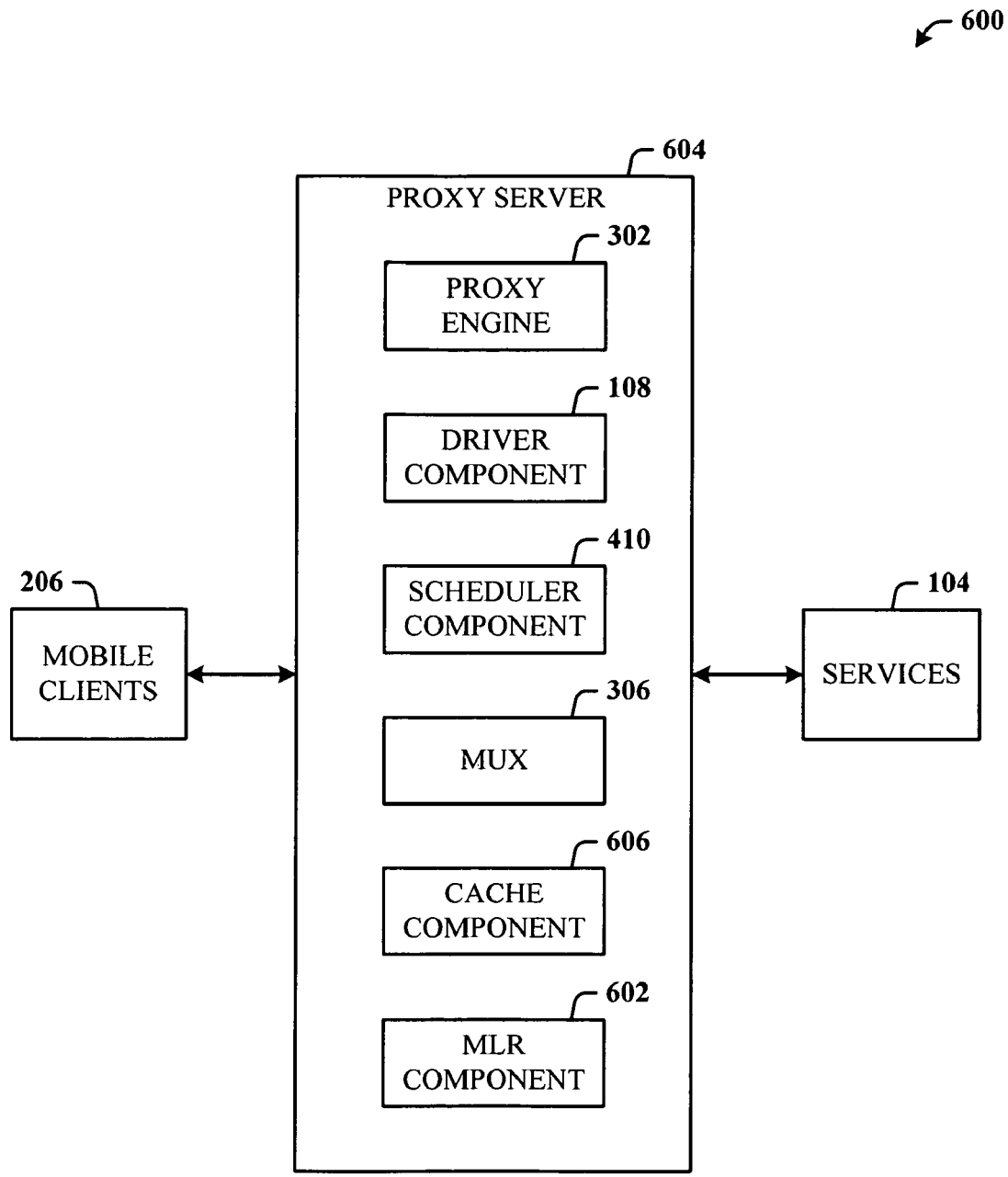
FIG. 6 illustrates a proxy device management system that employs a machine learning and reasoning component which facilitates automating one or more proxy functions.

FIG. 6 illustrates a proxy device management system 600 that employs a machine learning and reasoning (MLR) component 602 which facilitates automating one or more features. Here, a proxy server 604 includes the proxy engine 302 for processing state-related tasks, the driver component 108 for providing drivers to access the related backend systems and services 104, the scheduler component 410 for scheduling synchronization, and the mux 306 for multiple access of the backend services 104. Additionally, the server 602 can include a cache component 606 for fast data access and processing of client state information, for example. In one example, the cache component 606 facilitates pre-evaluation testing of the backend system work and any work needed for network access protection, for example, based on the virtual image state (and when device is offline). Pre-evaluation testing can be utilized for determining if a client needs critical updates and should be forced to contact the management endpoint immediately.

The cache component 606 can also maintain device configuration service provider values that can be frequently utilized and are non-volatile.

The subject architecture (e.g., in connection with selection) can employ various MLR-based schemes for carrying out various aspects thereof. For example, a process for determining when to asynchronously connect to backend services 104 can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example.

The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naive Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

For example, based on the type of client device, the MLR component 602 can learn and reason that synchronization may not need to be performed as frequently as other device types. In another example, the MLR component 602 can learn to read user preferences information of the client device as a means to prioritize which device state should be updated. Learning and reasoning can also be employed to adjust scheduling, address loading of the proxy server 604 relative to other enterprise proxy servers, when to scale up to another proxy server based on bandwidth and load, and so on.

Synchronization can also be event trigger-based. In this type of implementation, the client device can include an agent or similar software module that monitors changes to the client state, and when the scope of the changes meet predetermined or configured trigger criteria, the agent triggers a synchronization request to the proxy server 604. The state updates are then made to the virtual state image of the proxy server 604 for that client. When the corresponding client connects to the server 604, the client receives the latest updates.

These are only but a few examples of the flexibility that can be provided by the MLR component 602, as well as methods for obtaining backend synchronization. Other examples include the proxy server periodically polling the backend systems for updates for a given client or for all connected clients. Another example includes the backend systems queuing update requests to the server 604, wherein the server selects the requests on a first come-first served basis. Alternatively, the MLR component 602 can receive and prioritize the requests based on learned and reasoned behavior.

Figure 7:
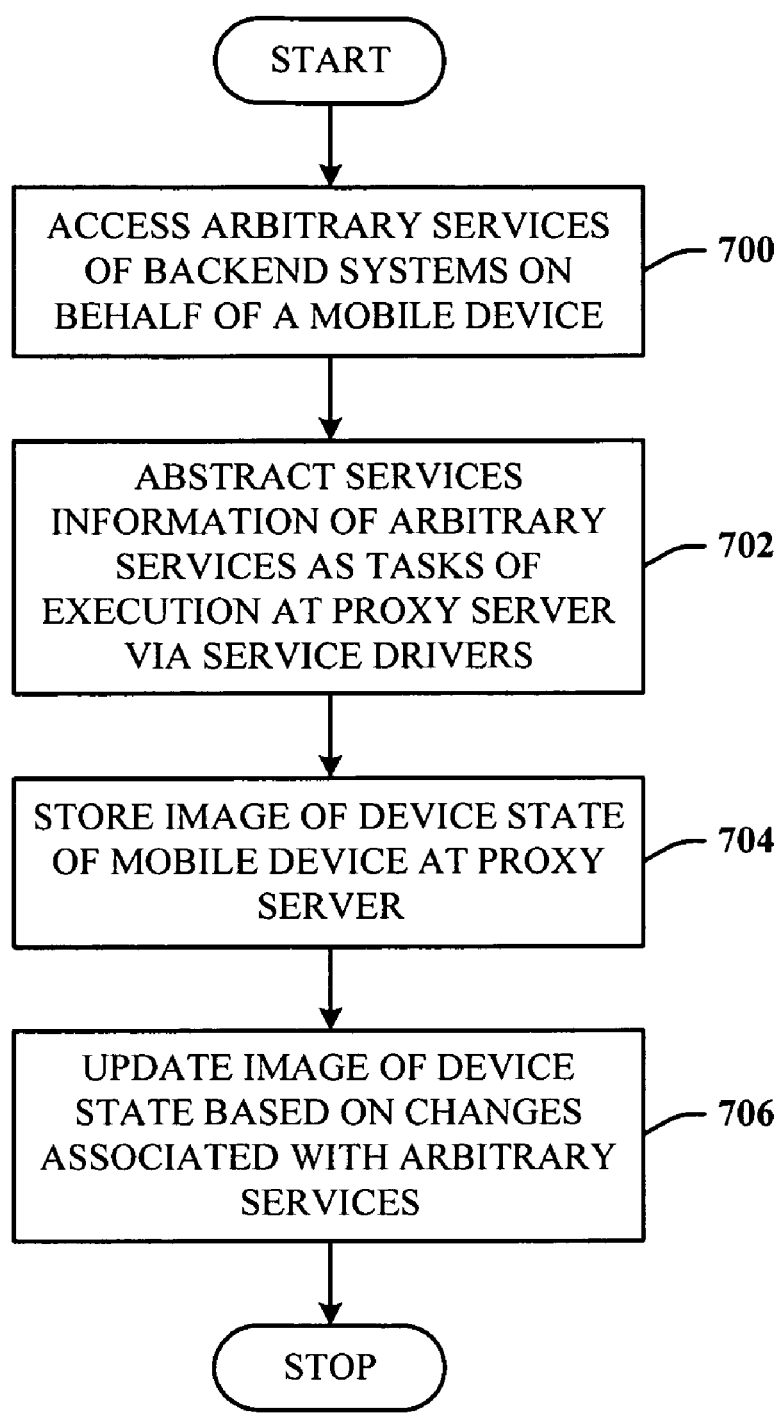
FIG. 7 illustrates a method of managing mobile devices via a proxy system.

FIG. 7 illustrates a method of managing mobile devices via a proxy system. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 700, arbitrary services of backend systems are accessed on behalf of a mobile device by a proxy server. At 702, services information from the backend systems is abstracted as tasks for execution at a proxy server via service drivers. At 704, an abstract image of device state of the mobile device is stored at the proxy server, the image including the service information. At 706, the image of the device state of the mobile device is updated based on changes associated with the arbitrary services.

Figure 8:
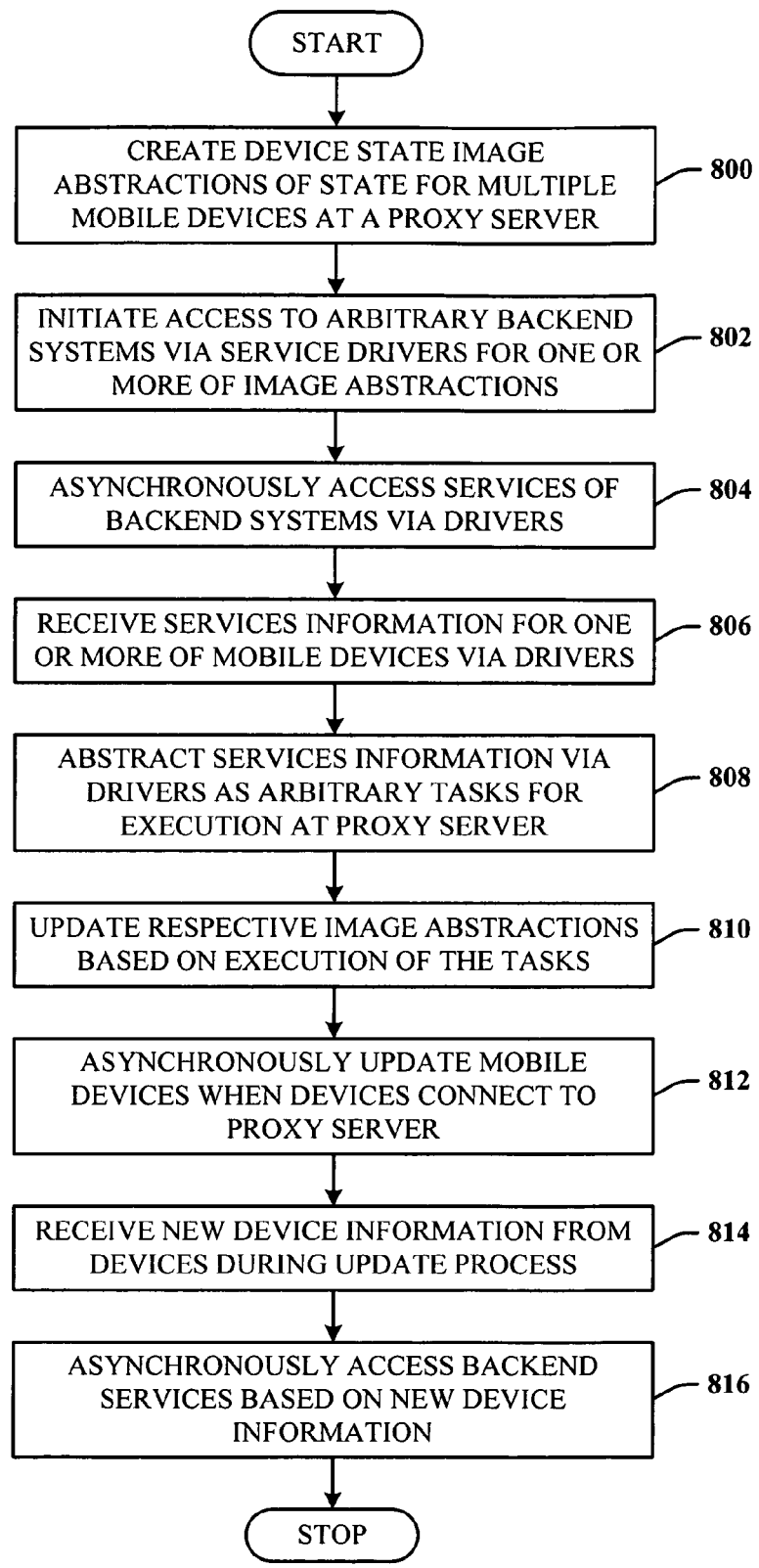
FIG. 8 illustrates a method of processing services and mobile devices by proxy.

FIG. 8 illustrates a method of processing services and mobile devices by proxy. At 800, device state image abstractions of state for multiple mobile devices are created at a proxy server. At 802, access to arbitrary backend systems is initiated via service drivers for one or more of the image abstractions. At 804, the services associated with arbitrary backend systems are asynchronously accessed. At 806, services information for one or more of the mobile devices is returned through the service drivers. At 808, the services information is abstracted via the service drivers as arbitrary tasks for execution at the proxy server. At 810, the respective image abstractions for the mobile devices are updated based on execution of the tasks. At 812, the mobiles devices are asynchronously updated from respective image abstractions when the devices connect to the proxy server. At 814, new device information is received from the mobile devices during the update process. At 816, the backend services are asynchronously accessed, when online, for new services information based on the new device information.

Figure 9:
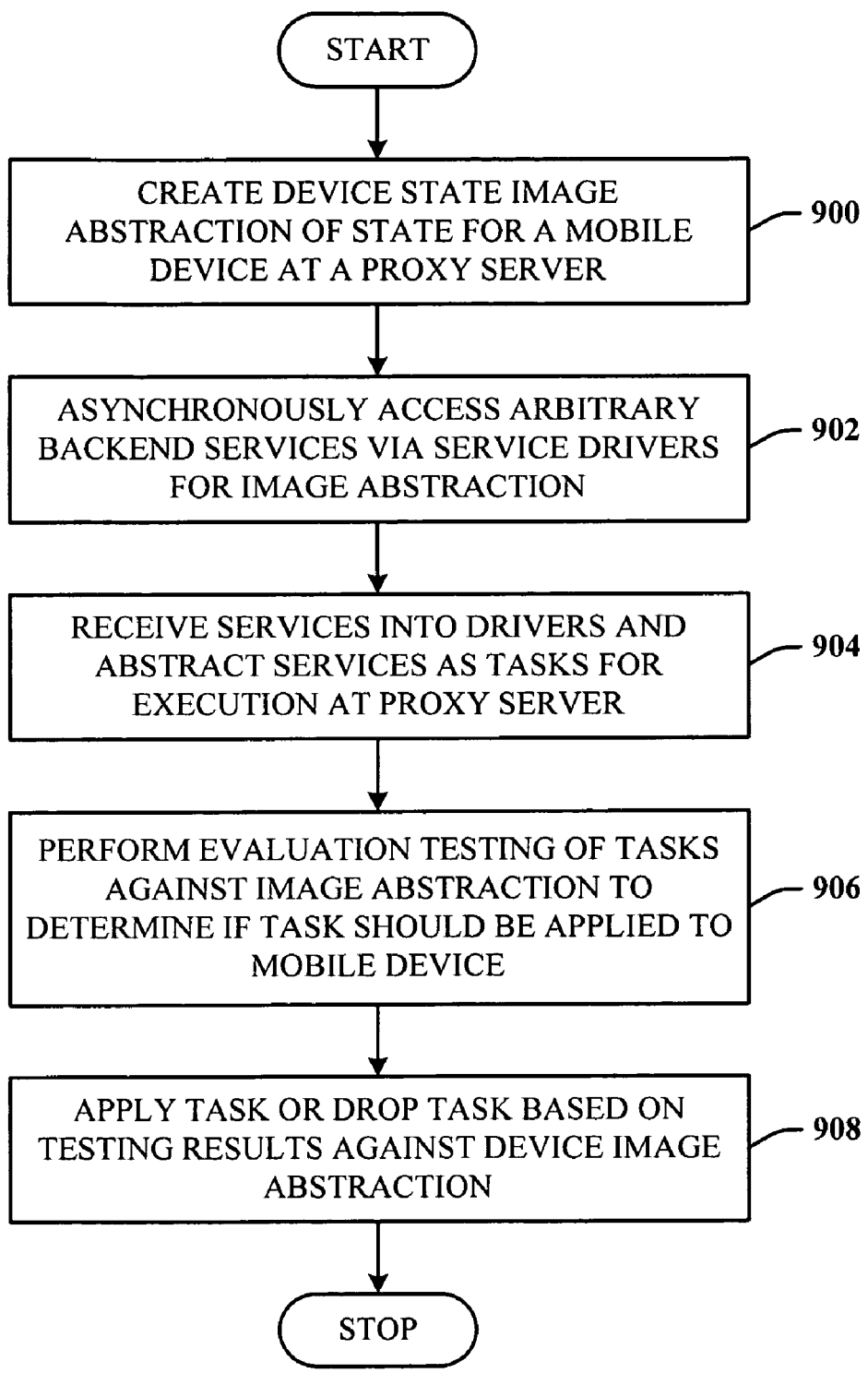
FIG. 9 illustrates a method of performing evaluation testing on a device image abstraction before applying updates to a mobile device.

FIG. 9 illustrates a method of performing evaluation testing on a device image abstraction before applying updates to a mobile device. At 900, a mobile device state image abstraction is created for a mobile device and stored on a proxy server. At 902, arbitrary backend services are asynchronously accessed via service drivers for the image abstraction. At 904, services are received into the drivers and abstracted as tasks for execution at the proxy server. At 906, evaluation testing of the tasks is performed against the image abstraction to determine if the one or more of the tasks should be applied to the mobile device. At 908, one or more of the tasks are either applied or dropped based on testing results against the image abstraction for the mobile device.

Figure 10:
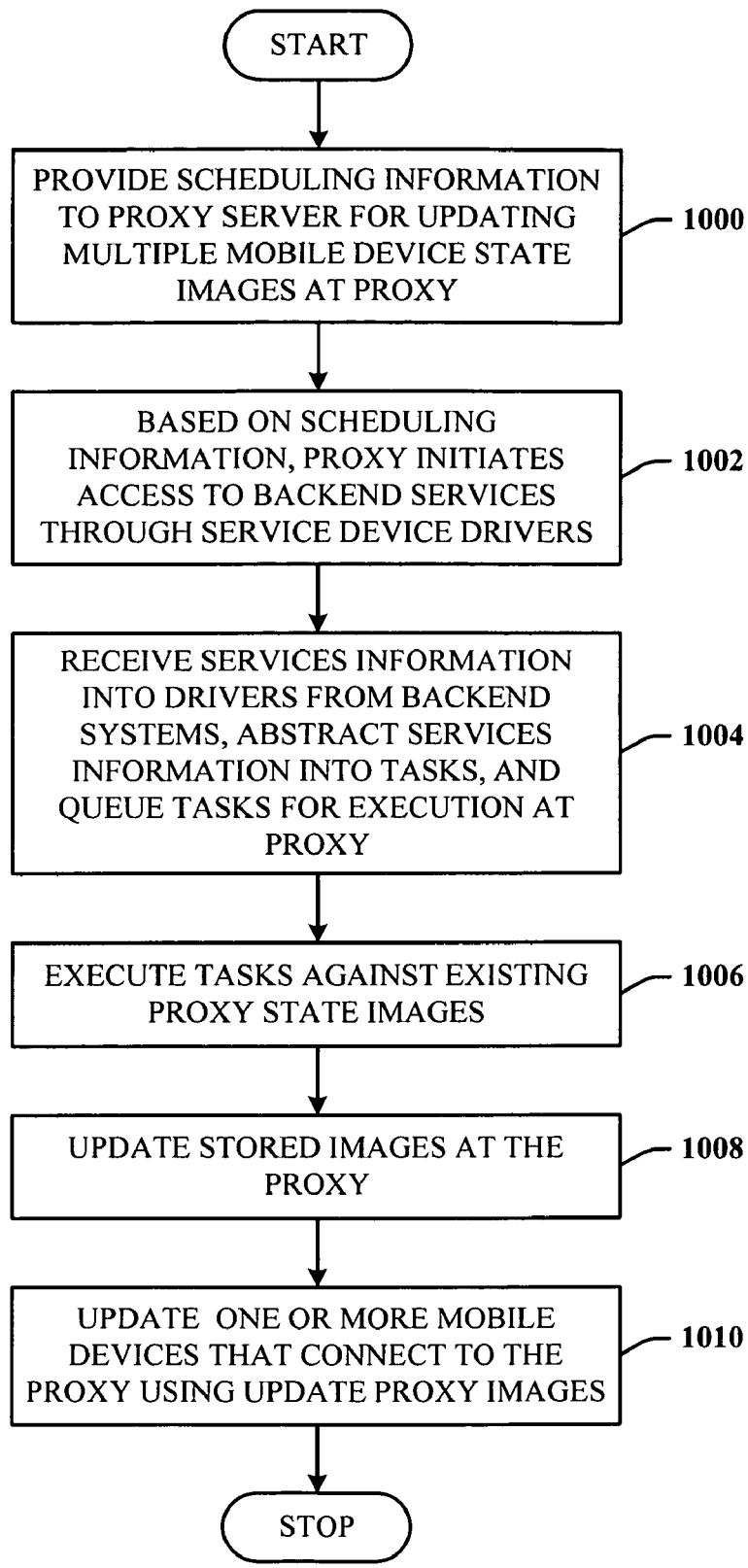
FIG. 10 illustrates a method of scheduling asynchronous access to backend services in accordance with the innovation.

FIG. 10 illustrates a method of scheduling asynchronous access to backend services in accordance with the innovation. At 1000, scheduling information is provided at the proxy for updating multiple mobile device state images at the proxy. At 1002, based on the scheduling information, the proxy server initiates access to the backend services through the service drivers. At 1004, services information from one or more of the backend systems is received into the service drivers, abstracted into tasks, and queued for task execution processing at the proxy. At 1006, the tasks are executed against existing proxy state images. At 1008, the updated images are stored. At 1010, one or more of the associated mobile devices connect asynchronously to the proxy server and receive updated state from the corresponding images.

Figure 11:
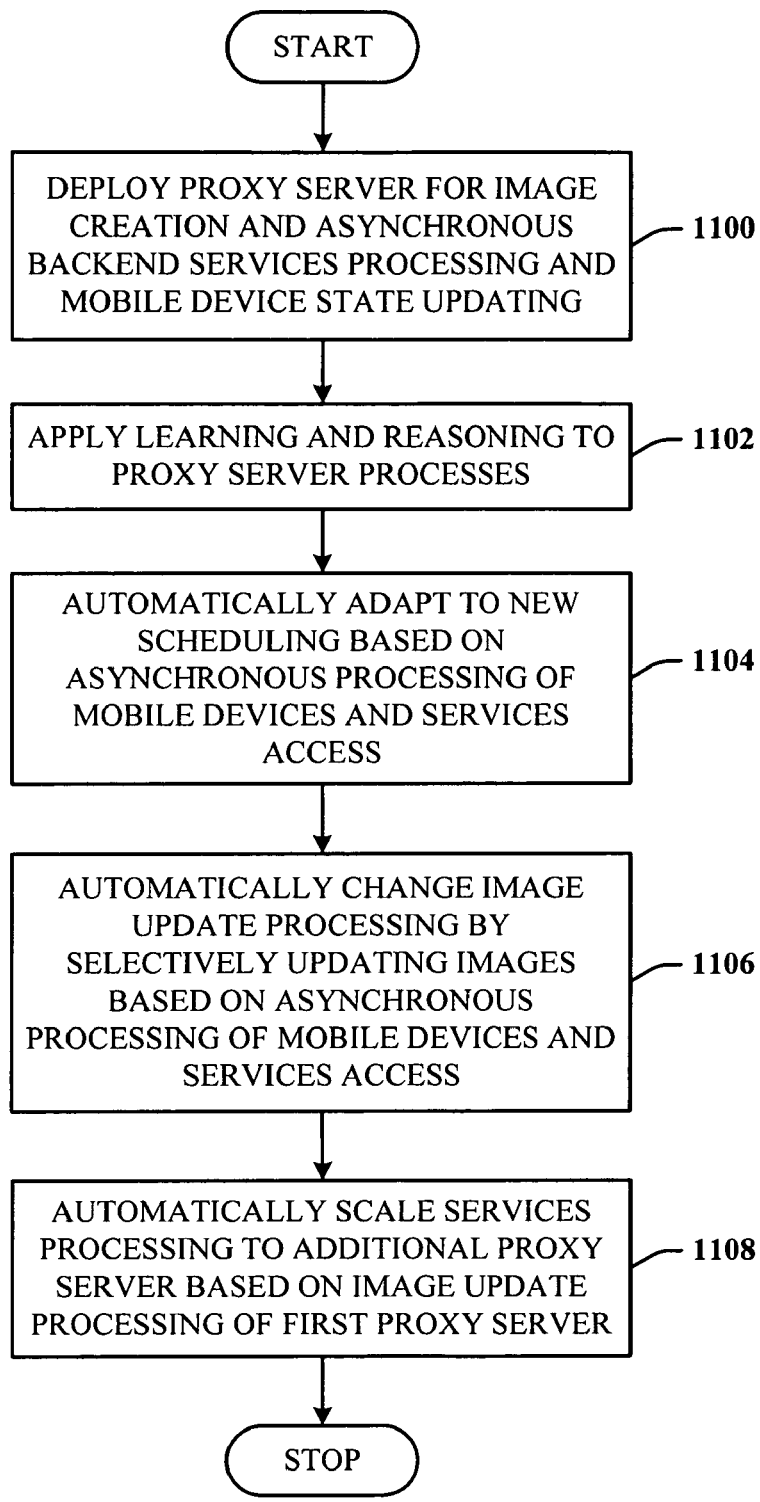
FIG. 11 illustrates a method of applying learning and reasoning processing for proxy device management processing.

FIG. 11 illustrates a method of applying learning and reasoning processing for proxy device management processing. At 1100, a proxy server is deployed for image creation and asynchronous backend services processing and mobile device state updating. At 1102, learning and reasoning is applied to the proxy server processes. At 1104, in view of existing asynchronous processing of mobile devices and services access, the proxy server automatically adopts new scheduling provided based on learning and reasoning. At 1106, in view of existing asynchronous processing of mobile devices and services access, the proxy server automatically adopts new image update processing and service access based on learning and reasoning. At 1108, in view of existing asynchronous processing of mobile devices and services access of a first proxy server, services processing is scaled to an additional proxy server based on learning and reasoning.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
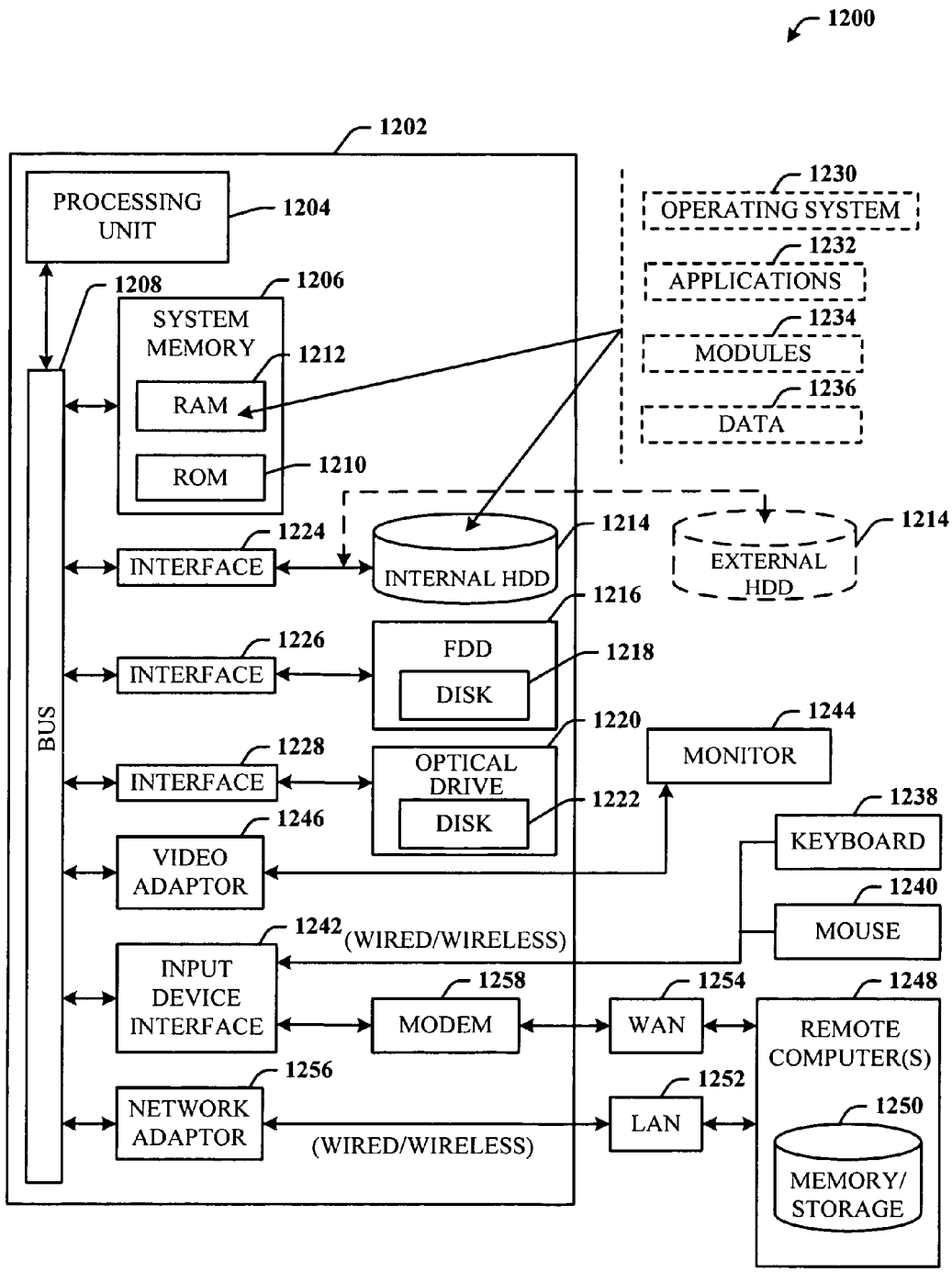
FIG. 12 illustrates a block diagram of a computing system operable to provide mobile device proxy processing in accordance the disclosed architecture.

Referring now to FIG. 12, there is illustrated a block diagram of a computing system 1200 operable to provide mobile device proxy processing in accordance the disclosed architecture. In order to provide additional context for various aspects thereof, FIG. 12 and the following discussion are intended to provide a brief, general description of a suitable computing system 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202, the computer 1202 including a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

The applications 1232 and/or modules 1234 can include the functionality and capabilities described herein associated with proxy component 102, driver component 108, proxy server 202, task execution engine 304, mux 306, proxy engine 406, sync component 408, scheduler component 410, driver wrapper 500, policy driver 502, layer 504, MLR component 602, and cache component 606, to name a few.

A user can enter commands and information into the computer 1202 through one or more wired/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device. 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 13:
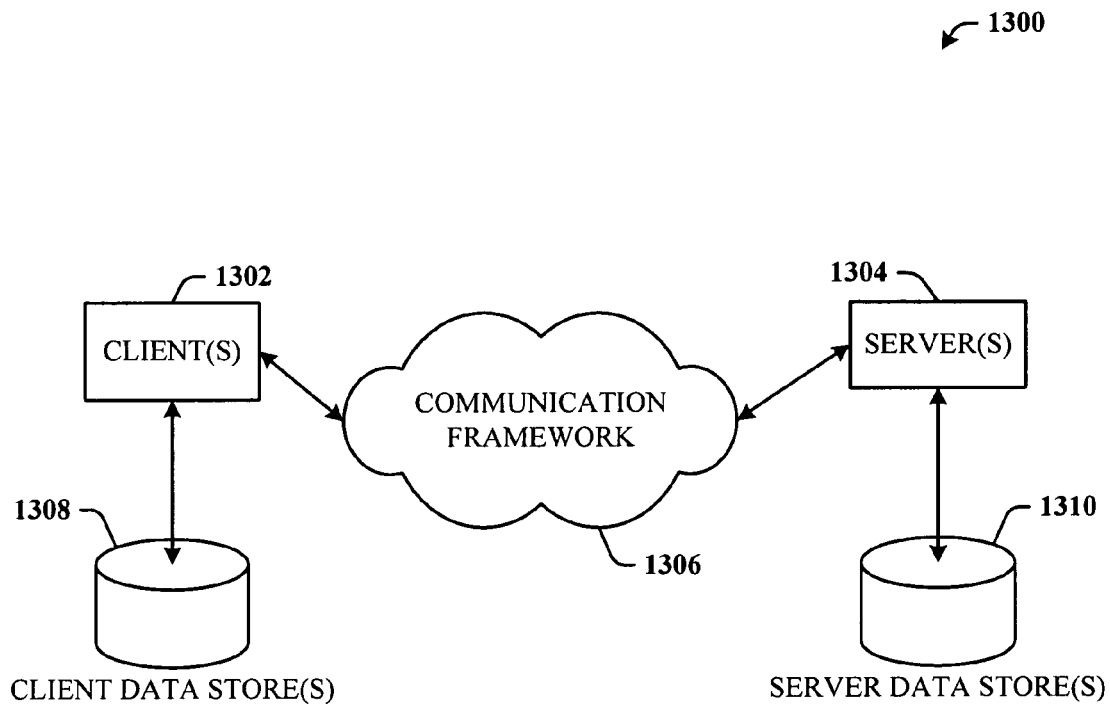
FIG. 13 illustrates a schematic block diagram of an exemplary computing environment that facilitates mobile client update by a proxy server for backend services.

Referring now to FIG. 13, there is illustrated a schematic block diagram of an exemplary computing environment 1300 that facilitates mobile client update by a proxy server for backend services. The system 1300 includes one or more client(s) 1302. The client(s) 1302 can be hardware and/or software (e.g., threads, processes, computing devices). The client(s) 1302 can house cookie(s) and/or associated contextual information by employing the subject innovation, for example.

The system 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed innovation. It is, of course, not possible to describe every conceivable combination of components and/or methodologies, but one of ordinary skill in the art may recognize that may further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented device management system, comprising:
   a processor for executing computer-executable components; and
   memory storing computer-executable components including:
     a proxy component for storing a virtual client image of a state of a mobile client in response to interaction with the mobile client and for accessing arbitrary services of a backend system on behalf of the mobile client; and
     a driver component for receiving services information of the arbitrary services from the backend system and for abstracting the services information of the arbitrary services as tasks via service drivers that correspond to the arbitrary services, the tasks for execution by the proxy component and associated with updating the state of the mobile client, wherein the proxy component is configured to access the virtual client image of the state of the mobile client that was stored for the mobile client, execute the tasks associated with updating the state of the mobile client, and store an updated virtual client image of the state of the mobile client based on execution of the tasks associated with updating the state of the mobile client.

2. The system of claim 1, wherein:
the updated virtual client image of the state of the mobile client includes state updates for the mobile client and driver information for the service drivers employed by the driver component for the mobile client, and
the proxy component accesses the arbitrary services based on the updated virtual client image.

3. The system of claim 1, wherein the proxy component is configured to:
execute the tasks and store the updated virtual client image of the state of the mobile client when the mobile client is offline, and
automatically update the state on the mobile client from the updated virtual client image of the state of the mobile client when the mobile client accesses the proxy component to receive changes to the state.

4. The system of claim 1, further comprising a multiple access component for providing access to the arbitrary services of the backend system via the driver component.

5. The system of claim 1, wherein the backend system includes services that comprise a directory service, an update service and a messaging service.

6. The system of claim 1, wherein the driver component is configured to queue the tasks for execution by the proxy component.

7. The system of claim 1, further comprising a cache component that facilitates evaluation testing of the tasks against the virtual client image of the state of the mobile client that was stored for the mobile client to determine whether to one or more of the tasks to be executed by the proxy component should be dropped.

8. The system of claim 1, further comprising a scheduling component for scheduling when the proxy component accesses the services for task processing.

9. The system of claim 1, wherein the mobile client communicates with the proxy component using an Open Mobile Alliance XML-based protocol.

10. The system of claim 1, further comprising a machine learning and reasoning component that employs at least one of a probabilistic-based analysis and a statistical-based analysis to infer an action that a user of the mobile client desires to be automatically performed.

11. A computer-implemented method comprising:
storing a virtual image of a device state of a mobile device at a proxy server in response to interaction with the mobile device;
accessing arbitrary services of one or more backend systems from the proxy server on behalf of the mobile device;
receiving services information of the arbitrary services at the proxy server;
abstracting the services information of the arbitrary services as tasks via service drivers that correspond to the arbitrary services, the tasks for execution at the proxy server and associated with updating the device state of the mobile device;
accessing the virtual image of the device state of the mobile device that was stored for the mobile device at the proxy server;
executing the tasks associated with updating the device state of the mobile device at the proxy server; and
storing an updated virtual image of the device state of the mobile device at the proxy server based on execution of the tasks associated with updating the device state of the mobile device.

12. The method of claim 11, further comprising processing the tasks in batches.

13. The method of claim 11, further comprising executing the tasks and storing the updated virtual image of the device state of the mobile device when the mobile device is offline.

14. The method of claim 11, further comprising queuing the tasks to be executed using the service drivers that correspond to the arbitrary services.

15. The method of claim 11, further comprising asynchronously accessing multiple backend systems from the proxy server, the multiple backend systems associated with the arbitrary services.

16. The method of claim 11, further comprising performing evaluation testing of the tasks against the virtual image of the device state of the mobile device that was stored for the mobile device to determine if the arbitrary services are compatible for the mobile device.

17. The method of claim 16, further comprising delaying update of the device state on the mobile device based on the evaluation testing.

18. The method of claim 11, further comprising caching device configuration values for condition evaluation of the device state prior to updating the device state on the mobile device.

19. The method of claim 11, further comprising automatically updating the device state on the mobile device from the updated virtual image of the device state of the mobile device when the mobile device connects to the proxy server.

20. A computer-readable storage medium storing computer-executable instructions that, when executed, cause a server computer to perform a computer-implemented method comprising:
storing a virtual image of a device state of a mobile device at the server computer in response to interaction with the mobile device;
accessing arbitrary services of one or more backend systems from the server computer on behalf of the mobile device;
receiving services information of the arbitrary services at the server computer;
abstracting the services information of the arbitrary services as tasks via service drivers that correspond to the arbitrary services, the tasks for execution at the server computer and associated with updating the device state of the mobile device;
accessing the virtual image of the device state of the mobile device that was stored for the mobile device at the server computer;
executing the tasks associated with updating the device state of the mobile device at the server computer; and
storing an updated virtual image of the device state of the mobile device at the server computer based on execution of the tasks associated with updating the device state of the mobile device.

* * * * *